3,390,125
PROCESS FOR PREPARING A POLYPHENYLENE ETHER BY OXIDATION OF PHENOLS WITH NICKEL PEROXIDE

Hans-Dieter Becker, Schenectady, N.Y., assignor to General Electric Company, a corporation of New York
No Drawing. Filed Sept. 13, 1966, Ser. No. 579,001
4 Claims. (Cl. 260—47)

ABSTRACT OF THE DISCLOSURE

High molecular weight poly(2,6 - disubstituted - 1,4-phenylene)ethers are prepared from 2,6-dimethylphenol, 2-phenyl-6-methylphenol or 2,6-diphenylphenol by oxidation with nickel peroxide.

---

This invention relates to a process for preparing poly (2,6-disubstituted-1,4-phenylene) ethers by contacting a solution of a phenol selected from the group consisting of 2,6-dimethylphenol, 2-phenyl-6-methylphenol and 2,6-diphenylphenol in an inert solvent, with nickel peroxide, whereby the phenol is oxidized by the nickel peroxide to the corresponding poly(2,6-disubstituted-1,4-phenylene) ether with water being a by-product of the reaction.

Polyphenylene ethers are a class of thermoplastics having a unique combination of physical, chemical and electrical properties over a large temperature range which render them suitable for a wide variety of commercial applications in the form of molded and extruded objects as well as films and fibers. They were first discovered by A. S. Hay and are disclosed and claimed in his U.S. Patents 3,306,874 and 3,306,875 which were copending applications, Ser. Nos. 212,127 and 212,128, filed July 24, 1962, the latter being a continuation-in-part of earlier filed applications. In the Hay process, various phenols are oxidatively coupled by reaction with oxygen in the presence of an amine-basic cupric salt complex as the oxygen carrying intermediate. Because of the presence of the amine, a slight amount of this amine is incorporated in the polymer, probably by occlusion during the precipitation step in recovering the polymer. In order to obtain the lightest color polymers which will remain so when subjected to heat, it is highly desirable to reduce the amount of amine in the polymer to a very low limit. This requires an extra process step in the manufacture of polyphenylene ethers by this process.

Since their discovery by Hay, other persons have investigated other oxidizing agents for oxidatively coupling of phenols to polyphenylene ethers. For example, Price and Staffin in the November 1958 issue of Rubber Age, p. 295, described the preparation of polyphenylene ethers having a degree of polymerization of about 20 from 2,6-dimethyl-4-bromophenol using the sodium salt of 2,6-dimethyl-4-bromophenol in the presence of reagents capable of oxidizing the phenolate ion to a phenoxide radical, for example, iodine, benzoyl peroxide, ferricyanide ion, or lead tetraacetate. This process requires the halogenation of a 2,6-disubstituted phenol with the halogen being removed during the polymer formation reaction, thereby making this an expensive process because of necessity of both introducing and then removing the halogen from the phenol nucleus.

Lindgren in Acta Chemica Scandinavica, 14, 1203–1210 (1960) describes the oxidation of 2,6-dimethylphenol with silver oxide to produce polymers having a degree of polymerization of between 10 to 16 which correspond to the molecular weight of about 1300–1900.

McNelis in U.S. Patent 3,220,979 describes a process using manganese dioxide to oxidize 2,6-disubstituted phenols to the corresponding polyphenylene ethers. In U.S. Patent 3,260,701, McNelis describes the same reaction using lead dioxide as an oxidation catalyst. With both of these oxidation catalysts, the reaction takes a considerable length of time and, in general, produces relatively low molecular weight polymers.

Unless the polyphenylene ethers have a molecular weight of at least 10,000, they are too low in molecular weight to produce useful articles. With the use of oxygen in addition to the metal oxides, McNelis obtained molecular weights up to about 15,000 to 20,000. However in order to obtain these molecular weights, even with the use of oxygen in addition to the metal oxide, it is necessary to use a large excess of the metal oxide, for example, from 3 to 10 moles of the metal oxide per mole of phenol and to use a contact time of several hours and a temperature of at least 65° C. Because of side reactions, the yield of polymer using these oxides is, at best, in the order of 50 to 60% of the amount of phenol used. Furthermore, this process is extremely expensive because of the large amount of metal oxide which must be used in relation to the amount of phenol reactant.

Unexpectedly, I have discovered that nickel peroxide is an extremely effective oxidizing agent for oxidizing 2,6-dimethylphenol, 2-phenyl-6-methylphenol and 2,6-diphenylphenol to high molecular weight polymers having intrinsic viscosities in excess of at least 0.3 dec. 1./g. measured in chloroform at 25° C. The polymers are essentially completely free of any contaminants. The nickel peroxide is and remains insoluble in the reaction mixture so that it is readily removed by filtration by using a solvent for the reaction which is inert to both the reactant and the oxidizing agent and which will dissolve both the starting phenol and the resulting polyphenylene ether.

Although 2 to 10 moles of the nickel peroxide per mole of phenol is required, the spent peroxide is readily regenerated by simply washing it with a mild oxidizing agent, e.g., an alkaline hypochlorite solution, for example, sodium hypochlorite. This greatly reduces the cost of the process, since the regenerating agent is extremely cheap in relation to the cost of the nickel peroxide or other prior art metal peroxides. Furthermore, nickel peroxide is so reactive that it causes an exothermic reaction so that the above-named phenols are rapidly oxidized to high molecular weight polyphenylene ethers in a matter of minutes. Because of these factors, my process is extremely economical and highly advantageous because of its simplicity over the prior art process.

Since the reaction is exothermic, no external heat needs to be applied. In fact, when large batches are made, it may be desirable to supply external cooling to control the exothermic reaction. This may be done by use of cooling coils or by using a relatively low boiling solvent and permitting the solvent to reflux. In general, it is desirable to control the reaction temperature, so that it does not exceed substantially 40° C., since the quality of the product, especially its color, is thereby improved. Temperatures lower than about 20° C. slow the reaction so that longer times are required. Because of this I prefer to carry out the reaction between 20 and 40° C., although higher or lower temperatures can be used if desired. Likewise, super- or sub-atmospheric pressure may be used, but no advantages are obtained over using atmospheric pressure.

Because of the extreme activity of nickel peroxide, high molecular weights are obtained without supplemental use of air or oxygen containing gases to further promote the reaction. However, since the presence of air causes no problem, it is not necessary to use an inert atmosphere for carrying out the reaction, further simplifying the process. An inert atmosphere may be used if so desired.

Completion of the reaction is determined by the fact that no more heat is generated by the exothermic reaction and the color which is initially produced has essentially disappeared. This is generally in a matter of 20 to 30 minutes. Longer contact of the reaction mixture with the nickel peroxide does not cause any complications, since the polyphenylene ether is apparently not adversely affected by contact with the oxidizing agent, and can be desirable to produce still higher molecular weights. However, the greatest increase in molecular weight occurs during the first 30 minutes.

Because of the extreme rapidity of the reaction, the insolubility of the nickel peroxide in the reaction mixture and the ability to regenerate the nickel peroxide, my process is readily adaptable to a very simple continuous process. In such a process, two reactors containing the nickel peroxide are connected in parallel. A solution of the phenol is fed to one of the reactors using a flow rate and volume of catalyst sufficient to permit sufficient retention time in the reactor for completion of the exothermic reaction. When the nickel peroxide in one reactor becomes spent, the flow of the phenol solution is transferred to the other reactor. After draining, the reaction mixture from the first reactor, preferably followed by a solvent flush, the nickel peroxide is regenerated by a flow of an alkaline solution of alkali hypochloride, for example, sodium hypochlorite, potassium hypochlorite etc., to the reactor. After the nickel peroxide is regenerated, the hypochlorite solution is drained from the reactor, preferably followed by a water flush, and it is ready to be reused.

The polyphenylene ether so produced by my reaction is readily isolated from the solution after removal of the nickel peroxide, by adding a non-solvent for the polymer, e.g., for example, methanol, ethanol, petroleum ethers, etc., or evaporation of the solvent, for example, by a flash distillation, spray drying, etc. Any unreacted starting phenol is likewise distilled at this point. If a non-solvent for the polymer is added to the solution, the solvent and the non-solvent may be separately recovered by a fractional distillation and reused. It is of course obvious that in place of a continuous process, a batch process may be used if desired. In ether case, the only necessary reactants consumed in the reaction are the particular phenols and the alkaline alkali hypochlorite solution used to regenerate the nickel peroxide.

Typical solvents which may be used for my reaction are the liquid aromatic hydrocarbons, for example, benzene, toluene, xylene which are the preferred group of solvents because they are readily available and low in cost. On the other hand, other solvents such as dichlorobenzene, etc. may be used, the only requirement being that the solvent is not reactive under the reaction conditions and will dissolve both phenol and the polyphenylene ether product. Solvents which dissolve only the phenol, but not the polymer could be used, but would complicate the reaction unless carried out in a batch process, since it would be necessary to dissolve the polymer in order to separate it from the nickel peroxide.

The amount of nickel peroxide necessary to carry out the reaction may vary between rather broad limits. As a minimum, at least one mole of nickel peroxide per mole of phenol oxidized should be used. In order to obtain the highest weight molecular polymers, it is desirable to use at least 1.5 moles of nickel peroxide per mole of the phenol to be oxidized with no difficulty being encountered with amounts greatly in excess of this, for example, 10 or more moles of nickel peroxide per mole of the phenol to be oxidized.

The nickel peroxide is readily prepared by the method disclosed in J. Org. Chem., 27, 1597 (1962), i.e., treatment of an aqueous solution of a nickel salt with sodium hypochlorite made alkaline with sodium hydroxide. The nickel peroxide precipitates as a black powder which is readily removed by filtration and washed with water and dried.

Alternatively, the nickel electrode of a nickel cadmium battery may be used in the charged condition since the active element of the electrode will be nickel peroxide. In this case, the spent nickel peroxide may be regenerated by washing the plate free of the reaction mixture reassembling into battery and recharging the battery. After recharging, the alkaline electrolyte is washed from the plate and is ready for reuse.

For a given degree of polymerization, i.e., the average number of monomer units is a polymer molecule, the number average molecular weight of the polymer will be dependent on the molecular weight of the monomer unit, e.g., 120 for the monomer unit be poly(2,6-dimethyl-1,4-phenylene) ether, 182 for the monomer unit be poly(2-phenyl-6-methyl-1,4-phenylene) ether and 244 for the monomer unit be poly(2,6-diphenyl-1,4-phenylene) ether. This means that for a given degree of polymerization, the number average molecular weight of the polymer will be higher as phenyl substituents replace the methyl substituents.

As a general rule, physical properties, such as flexibility and tensile strength which are necessary for films and fibers, increase with increase in average degree of polymerization. For all three polymers the average molecular weight should be at least 10,000, to produce molded objects of any utility. For films and fibers, especially those which are to be axially oriented to increase their strength, it is desirable that the number average molecular weight of poly(2,6-dimethyl-1,4-phenylene) ether generally be at least 12,000 and preferably at least 20,000. This corresponds to an average degree of polymerization of at least 100 and preferably at least 167. For poly(2,6-diphenyl-1,4-phenylene) ether, the corresponding values are at least 54,000 and preferably at least 110,000 for moleucular weight and 220 and preferably 450 for average degree of polymerization. The values for poly(2-phenyl-6-methyl-1,4-phenylene) ether are intermediate with respect to the above values for the other two polymers.

Once the minimum values have been reached, satisfactory, films and fibers can be made. Further improvement in properties are obtained as still higher molecular weight polymers are used. This is also true for the making of molded objects, but an increase in molecular weight does increase the molding temperature required. Therefore, it is highly desirable to make as high a molecular weight polymer as possible.

By determining the correlation between intrinsic viscosity and molecular weight of these polymers it is a simple matter to convert the intrinsic viscosity of a given polymer to molecular weight. For the above polymers an intrinsic viscosity of 0.3, dec. 1./g. measured in chloroform at 25° C. corresponds to a number average molecular weight (determined osmotically) of about 10,000 for poly(2,6-dimethyl-1,4-phenylene) ether, 24,000 for poly-(2-phenyl-6-methyl-1,4-phenylene) ether and 54,000 for poly(2,6-diphenyl-1,4-phenylene) ether.

In order that those skilled in the art may better understand my invention, the following examples are given by way of illustration and not by way of limitation. In all the examples, all parts are by weight unless otherwise stated. Intrinsic viscosities are in dec. l./g. measured in chloroform at 25° C.

Example 1

A solution of 1.2 g. of 2,6-dimethylphenol in 60 ml. of benzene was prepared and 12 g. of nickel peroxide was added. The reaction mixture immediately turned yellow and heat was involved. The heterogeneous mixture was shaken for 20 minutes by which time the exothermic reaction had subsided. The solution was filtered to remove the nickel peroxide and the filtrate poured into 300 ml. of methanol. The polymer, which precipitated, was removed by filtration and was readily cast into flexible films from a solution in dichloroethylene. The intrinsic viscosity was 0.5 measured in chloroform at 25° C. A yield of greater than 80% of poly(2,6-dimethyl-1,4-phenylene) ether based on the amount of phenol used was obtained.

Example 2

To a solution of 2 g. of 2-phenyl-6-methylphenol in 100 ml. of benzene, 20 g. of nickel peroxide was added. The solution was placed on a shaker overnight (approximately 16 hours). After isolating the polymer as described in Example 1 there was obtained a yield of 1.1 g. of poly-(2 - phenyl - 6-methyl-1,4-phenylene) ether having an intrinsic viscosity of 0.88. A solution of this polymer likewise produced a tough, flexible film.

Example 3

A solution of 1 g. of 2-phenyl-6-methylphenol in 50 ml. of benzene was shaken with 1 g. of the nickel electrode from a charged nickel cadmium battery for a period of 16 hours. After isolation of the polymer as described in Example 1, there was obtained 0.875 g. of poly(2-phenyl-6-methyl-1,4-phenylene) ether having an intrinsic viscosity of 0.46.

Example 4

This example illustrates not only the making of poly-(2,6-diphenyl-1,4-phenylene) ether but the effect of allowing sufficient time for both the exotherm and the color to disappear as a measure of determining the extent of reaction.

A solution of 1 g. of 2,6-diphenylphenol in 50 ml. of benzene was shaken for 10 minutes with 10 g. of nickel peroxide. By this time no more heat was generated. However, the supernatant solution was still deep yellow. Isolation of the polymer as described in Example 1., gave 0.7 g. of polymer having an intrinsic viscosity of 0.26.

Repeating the reaction but shaking for 30 minutes still left a solution that was lightly colored. The 0.7 g. isolated polymer had an intrinsic viscosity of 0.32. Repeating the preparation but using 2 g. of 2,6-diphenylphenol and 20 g. of nickel peroxide and shaking overnight left an essentially colorless solution. The 1.5 g. of isolated polymer had an intrinsic viscosity of 0.80.

In addition to making homopolymers, copolymers of any two or all three of the three phenols can be made by using a mixture in any desired proportions of any of these phenols in place of the single phenol in any of the above examples.

Although the above examples have illustrated how my invention can be carried into effect, other modifications and variations may be used as will be readily recognized by those skilled in the art. For example, the nickel peroxide does not need to be added all at once but may be added in increments thereby aiding in control of the exothermic reaction. Other variations have already been mentioned previously.

The polyphenylene ethers of this invention have a wide variety of use for example, they may be molded into useful objects by compression injection or extrusion techniques, they may be blow molded into various shapes or fabricated into films or fibers from solution or by extrusion and may be axially oriented if desired to increase their strength. They likewise may be extruded or solution coated on to electrical conductors to provide insulation. Other uses for the polymers of this invention will be readily recognized by those skilled in the art.

Obviously other modifications and variations of the present invention are possible in light of the above teachings. Therefore, it is to be understood that changes may be made in the particular embodiments of the invention described which are within the full intended scope of the invention as defined by the appended claims.

What I claim as new and desire to secure by Letters Patent of the United States is:

1. The process for producing a poly(2,6-disubstituted-1,4-phenylene) ether having a number-average molecular weight of at least 10,000, which comprises contacting a solution of a phenol selected from the group consisting of 2,6-dimethylphenol, 2-phenyl-6-methylphenol and 2,6-diphenylphenol, in an inert solvent for the phenol and the polyphenylene ether, with at least one and one-half moles of nickel peroxide per mole of said phenol.

2. The process of claim 1 wherein the phenol is 2,6-dimethylphenol.

3. The process of claim 1 wherein the phenol is 2-phenyl-6-methylphenol.

4. The process of claim 1 wherein the phenol is 2,6-diphenylphenol.

References Cited

UNITED STATES PATENTS

| | | | |
|---|---|---|---|
| 3,220,979 | 11/1965 | McNelis | 260—47 |
| 3,260,701 | 7/1966 | McNelis | 260—47 |

OTHER REFERENCES

Nagakawa et al., J. Org. Chem., 27, 1597–1601 (1962).

WILLIAM H. SHORT, *Primary Examiner.*

M. GOLDSTEIN, *Assistant Examiner.*